US008798510B2

(12) United States Patent
Calamita

(10) Patent No.: US 8,798,510 B2
(45) Date of Patent: Aug. 5, 2014

(54) AUTOMATIC MOB SENSOR TIMING ADJUSTMENT

(75) Inventor: James P. Calamita, Spencerport, NY (US)

(73) Assignee: Xerox Corporation, Norwalk, CT (US)

( * ) Notice: Subject to any disclaimer, the term of this patent is extended or adjusted under 35 U.S.C. 154(b) by 140 days.

(21) Appl. No.: 13/556,246

(22) Filed: Jul. 24, 2012

(65) Prior Publication Data

US 2014/0029805 A1 Jan. 30, 2014

(51) Int. Cl.

| | |
|---|---|
| ***G03G 15/01*** | (2006.01) |
| ***G03G 15/00*** | (2006.01) |
| ***G06K 9/00*** | (2006.01) |
| *B41J 2/385* | (2006.01) |
| *B41J 2/47* | (2006.01) |
| *G01D 15/06* | (2006.01) |

(52) U.S. Cl.

USPC ........... 399/301; 382/106; 347/116; 347/232; 399/72

(58) Field of Classification Search

None

See application file for complete search history.

(56) References Cited

U.S. PATENT DOCUMENTS

| | | | | |
|---|---|---|---|---|
| 2004/0114025 A1* | 6/2004 | Kerxhalli et al. | ............. | 347/232 |
| 2006/0092257 A1* | 5/2006 | Dejong et al. | ................ | 347/116 |
| 2010/0014896 A1* | 1/2010 | Calamita et al. | .............. | 399/301 |

* cited by examiner

*Primary Examiner* — Amir Alavi
*Assistant Examiner* — Kenny Cese
(74) *Attorney, Agent, or Firm* — Fay Sharpe LLP

(57) ABSTRACT

When reading calibration chevrons during mark-on-belt (MOB) sensor timing calibration, cyan portions or legs of printed chevrons are detected in order to determine a timing window offset adjustment. Depending on which of the six cyan legs on the left side of the chevrons are detected, a determination can be made regarding whether the window needs to be started earlier or later. If only the first two cyan legs on the left side of the chevron are detected, then the MOB sensor timing window is beginning (and ending) too early and an appropriate adjustment can be made to cause the timing window to initiate later. If only the last two cyan legs on the left side of the chevron are detected, then the MOB sensor timing window is beginning (and ending) too late, and appropriate adjustment can be made to cause the timing window to initiate earlier.

19 Claims, 6 Drawing Sheets
(4 of 6 Drawing Sheet(s) Filed in Color)

AUTOMATIC MOB SENSOR TIMING ADJUSTMENT

TECHNICAL FIELD

The presently disclosed toward mark-on-belt (MOB) sensor calibration. More particularly, the teachings disclosed herein are applicable to methods and apparatuses wherein MOB sensor timing window adjustment is implemented.

BACKGROUND

The Mark-on-belt (MOB) sensors used to measure color to color (C2C) registration in conventional systems are enabled to look at the photoreceptor belt (PR belt) at predetermined times from the start of each belt revolution. These predetermined times are calculated based on the nominal geometry of the machine, the known belt layout, as well as the measured velocity of the PR. There has been a significant increase in the number of marks-on-belt that are not read correctly during Run Time IOI Correction (RTIC) because the timing window is not correctly positioned. System level studies to determine the discrepancy in the timing equations, variation of parts, changes in belt layout, etc., have not yielded the source of such error. Consequently, a large number of faults are logged for these read failures, and C2C registration performance is adversely affected because the measurements are not being made as frequently is desirable.

There is a need in the art for systems and methods that facilitate quickly and efficiently calibrating MOB sensors while overcoming the aforementioned deficiencies.

BRIEF DESCRIPTION

In one aspect, connection a computer-implemented method for calibrating timing for the mark-on-belt (MOB) sensor comprises marking a photoreceptor belt with cyan portions of at least a first and second calibration chevron ensembles, and using nominal timing, reading the first and second calibration chevron ensembles during a predefined sensor read window. The method further comprises analyzing a first signal from an outboard MOB leg of an outboard MOB that measures and outboard side of the first calibration chevron ensemble, and analyzing a second signal from an outboard MOB leg of an inboard MOB that measures an outboard side of the second calibration chevron ensemble, and for each chevron ensemble read, determining whether there are N cyan portions, where N is an integer, seen during the read window.

In another aspect, a system that facilitates calibrating timing for the mark-on-belt (MOB) sensor comprises a printer comprising a photoreceptor belt, wherein the printer marks the photoreceptor belt with cyan portions of at least a first and second calibration chevron ensembles. The system further comprises a processor configured to, using nominal timing, read the first and second calibration chevron ensembles during a predefined sensor read window, and to analyze a first signal from an outboard MOB leg of an outboard MOB that measures and outboard side of the first calibration chevron ensemble, and analyze a second signal from an outboard MOB leg of an inboard MOB that measures an outboard side of the second calibration chevron ensemble. The processor is further configured to, for each chevron ensemble read, determine whether there are N cyan portions, where N is an integer, seen during the read window.

In yet another aspect, a computer-implemented method for calibrating MOB sensor timing comprises marking inter-document zones of a photoreceptor belt with fewer than all lines of at least a first and second calibration chevron ensembles, wherein the marked lines have a common color, and reading the first and second calibration chevron ensembles during a predefined sensor read window. The method further comprises analyzing a first signal from an outboard MOB leg of an outboard MOB that measures and outboard side of the first calibration chevron ensemble, and analyzing a second signal from an outboard MOB leg of an inboard MOB that measures an outboard side of the second calibration chevron ensemble, and for each inter-document zone, determining whether N lines are detected, where N is an integer, seen during the read window.

BRIEF DESCRIPTION OF THE DRAWINGS

The file of this patent contains at least one drawing executed in color. Copies of this patent with color drawing(s) will be provided by the U.S. Patent and Trademark Office upon request and payment of the necessary fee.

DETAILED DESCRIPTION

The above-described problem is solved by executing a setup procedure that is performed during mark-on-belt (MOB) sensor calibration to measure the true location of chevron marks on the PR belt in RTIC mode and adjust the timing for each machine individually.

Figure 1:
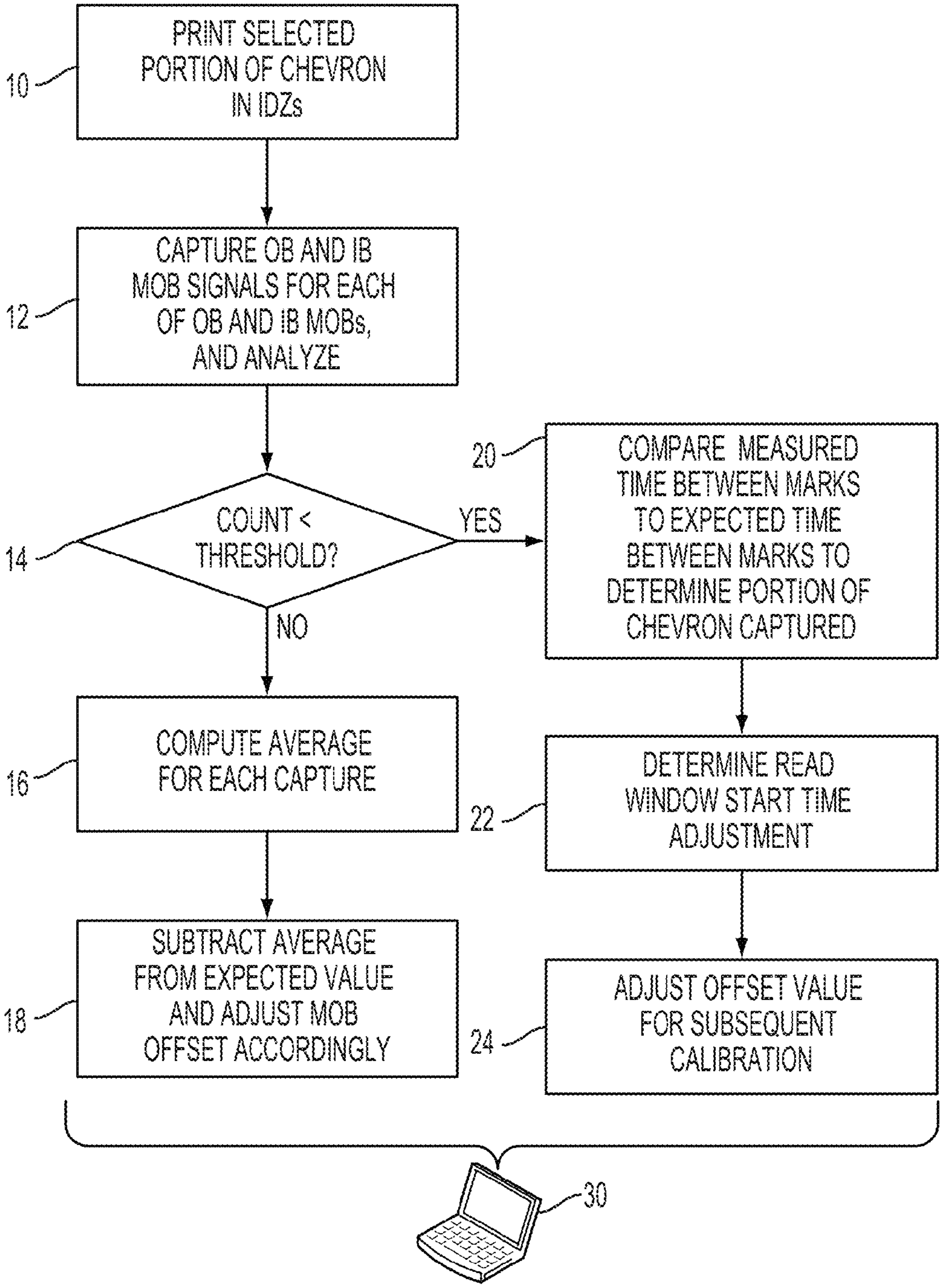
FIG. 1 illustrates a method for automatically adjusting MOB sensor timing for calibration of a print engine, in accordance with one or more features described herein.

FIG. 1 illustrates a method for automatically adjusting MOB sensor timing for calibration of a print engine, in accordance with one or more features described herein. During the MOB Calibration portion of a printer, the subject innovation provides a routine that can be triggered to execute after the normal LED calibration has been successfully completed. The routine adjusts the timing of the read window in order to ensure that the window is centered about the calibration marks. According to an example, at 10, after the LED calibration of the MOB has been successfully completed, the cyan portion (or other selected color) of the chevron ensemble is printed in the interdocument zones (IDZs) where they would normally be printed during run time (e.g., using 10 pitch mode). At 12, using the nominal timing, the signal coming off of the MOB leg that is measuring the left or outboard (OB) side of the chevron is captured and analyzed. This step is performed for both the inboard (IB) and the OB MOBs (see FIG. 4). At 14, for each IDZ (e.g., 10 IB+10 OB=20 total), a determination is made regarding whether there are N marks, where N is an integer, (e.g., 5 or some other predetermined number) seen during the read window, the N marks corresponding to a predetermined number of cyan marks in the OB side of the chevron ensemble pattern. If there are N reads in each window, then at 16, an average is computed for the time from the start of read to the first mark for each of M captures, where M is an integer, (e.g., 20 or some other predetermined number). The average value is subtracted from an expected distance value for the nominal start of read to the first chevron, at 18, and the difference (the result of the subtraction is used to adjust an MOD read time offset value in non-volatile memory (NVM) in order to cause the window to be centered on the chevron marks.

If there are less than N marks in any read window, then at 20, a determination is made regarding whether the read window is starting too early or too late. Since the pattern of the cyan chevrons in the OB leg of the ensemble is asymmetric (in the process direction), the measured time between marks can be compared to the expected time between marks to determine whether only the last portion of the pattern or only the first portion of the pattern has been captured, and a determination is made regarding an amount by which the read window needs to be started earlier or later, at 22. For instance, the amount by which the offset value in stored in NVM needs to be adjusted is determined from the geometry of the pattern. At 24, the offset value is adjusted according to the determination at 22.

According to an example, when reading calibration chevrons during the calibration procedure, it is useful to ensure that the MOB sensor timing window is properly positioned. To achieve this, the subject innovation uses preselected color of the CYMK (or RGBW) chevron. In one example, the subject innovation analyzes cyan portions or legs of the chevrons in order to determine the timing window offset adjustment. Since the calibration chevrons are not symmetric (i.e. the process direction spacing between the first 3 cyan marks on the OB leg is different than the process direction spacing between the last 3 marks on the OB leg), a number of detected cyan marks can be used to determine an appropriate adjustment to center the timing window on the chevron. Depending on which of the six cyan marks on the left side of the chevron are detected, a determination can be made regarding whether the window needs to be started earlier or later. For instance, if only the first two cyan marks on the left or outboard side of the chevron are detected, then it can be determined that the MOB sensor timing window is beginning (and ending) too early and an appropriate adjustment can be made to cause the timing window to initiate later. To further this example, if only the last two cyan marks on the left or outboard side of the chevron are detected, then it can be determined that the MOB sensor timing window is beginning (and ending) too late, and appropriate adjustment can be made to cause the timing window to initiate earlier. These calibrations can be performed, for example, during printer setup, after printer maintenance, on a predetermined schedule (e.g. once a week, once every N print jobs where N is a preselected number, etc.).

It will be appreciated that the method of FIG. 1 can be implemented by a computer 30, which comprises a processor (such as the processor 124 of FIG. 6) that executes, and a memory (such as the memory 126 of FIG. 6) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 6), a system memory (see, e.g., FIG. 6), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2:
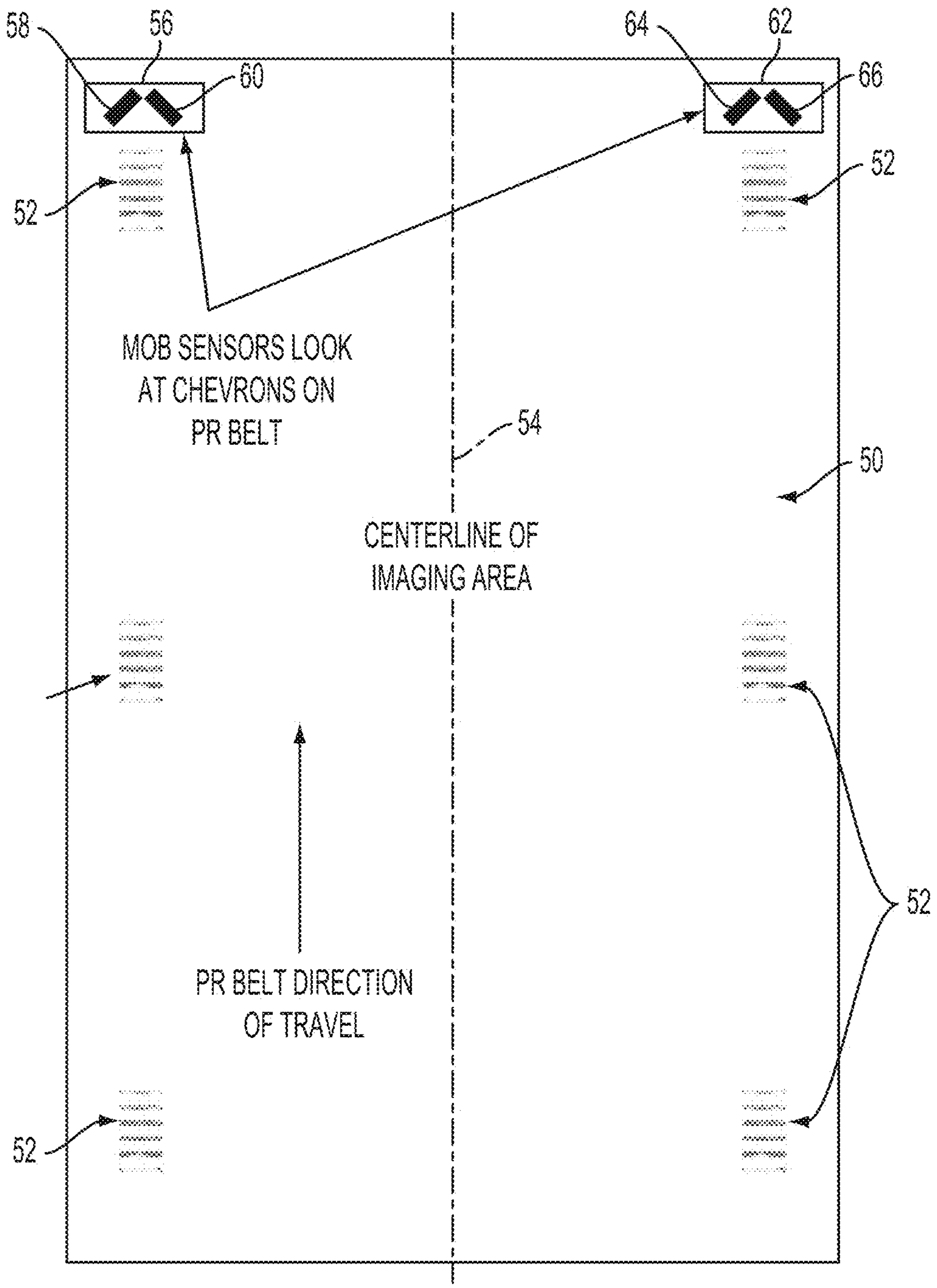
FIG. 2 illustrates a schematic diagram of the print engine belt layout with a plurality of chevrons printed thereon on either side of a center line of the imaging area, which are read by an outboard MOB sensor and an inboard MOB sensor, in accordance with various aspects described herein.

FIG. 2 illustrates a schematic diagram of the print engine belt 50 layout with a plurality of chevron ensembles 52 printed thereon on either side of a center line 54 of the imaging area, which are read be an outboard (OB) MOB sensor 56 on the left, comprising an OB optical element 58 and an inboard (IB) optical element 60, and an IB MOB sensor 62 (on the right side of the center line 54) comprising an OB optical element 64 and an IB optical element 66, in accordance with various aspects described herein. As illustrated, there are the two MOB sensors 56, 62: the inboard sensor 62 on the inboard side of the machine and the outboard sensor 56 on the outboard side of the machine (e.g., each located approximately 150 mm or some other predetermined distance from the center of scan). Each MOB sensor 56, 62 comprises two optical elements, each of which is used to measure one leg of the chevron registration test pattern.

Figure 3:
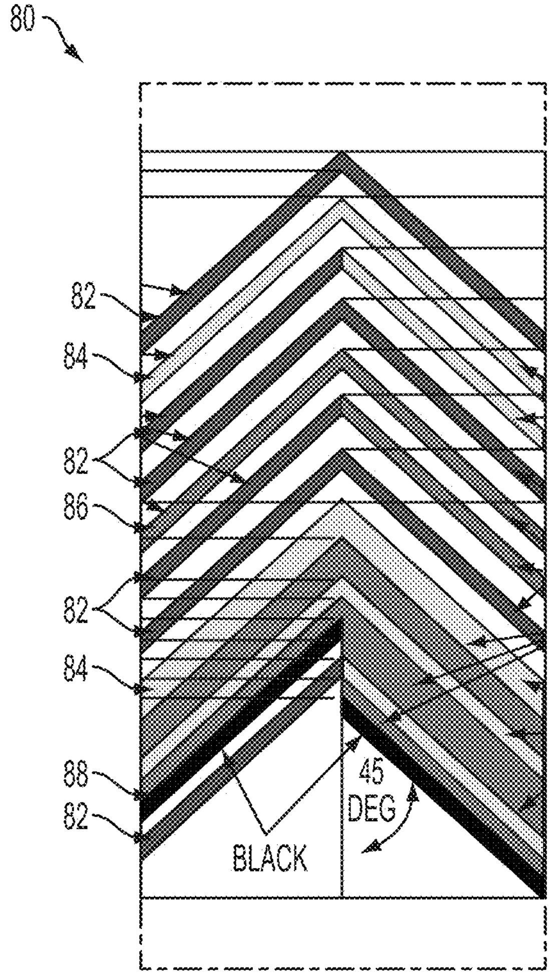
FIG. 3 is an illustration of a chevron ensemble used to measure lateral and process direction for color-to-color registration, in accordance with one or more aspects described herein.

FIG. 3 is an illustration of a chevron ensemble 80 used to measure lateral and process direction for color-to-color registration, in accordance with one or more aspects described herein. Each leg of the ensemble contains information about the color pairs relative to cyan (which is used in the described example as a reference color, although any suitable color may be used as a reference color as will be appreciated by those of skill in the art). The chevron ensemble includes a plurality of cyan legs 82, yellow legs 84, magenta legs 86, and black or key legs 88. Since the MOB sensor is color blind, it only registers a change in voltage as the marks pass under the sensor. When the marks are completely captured by the timing window, there are 10 changes in voltage registered by each leg of each MOB, as shown in FIG. 4.

Figure 4:
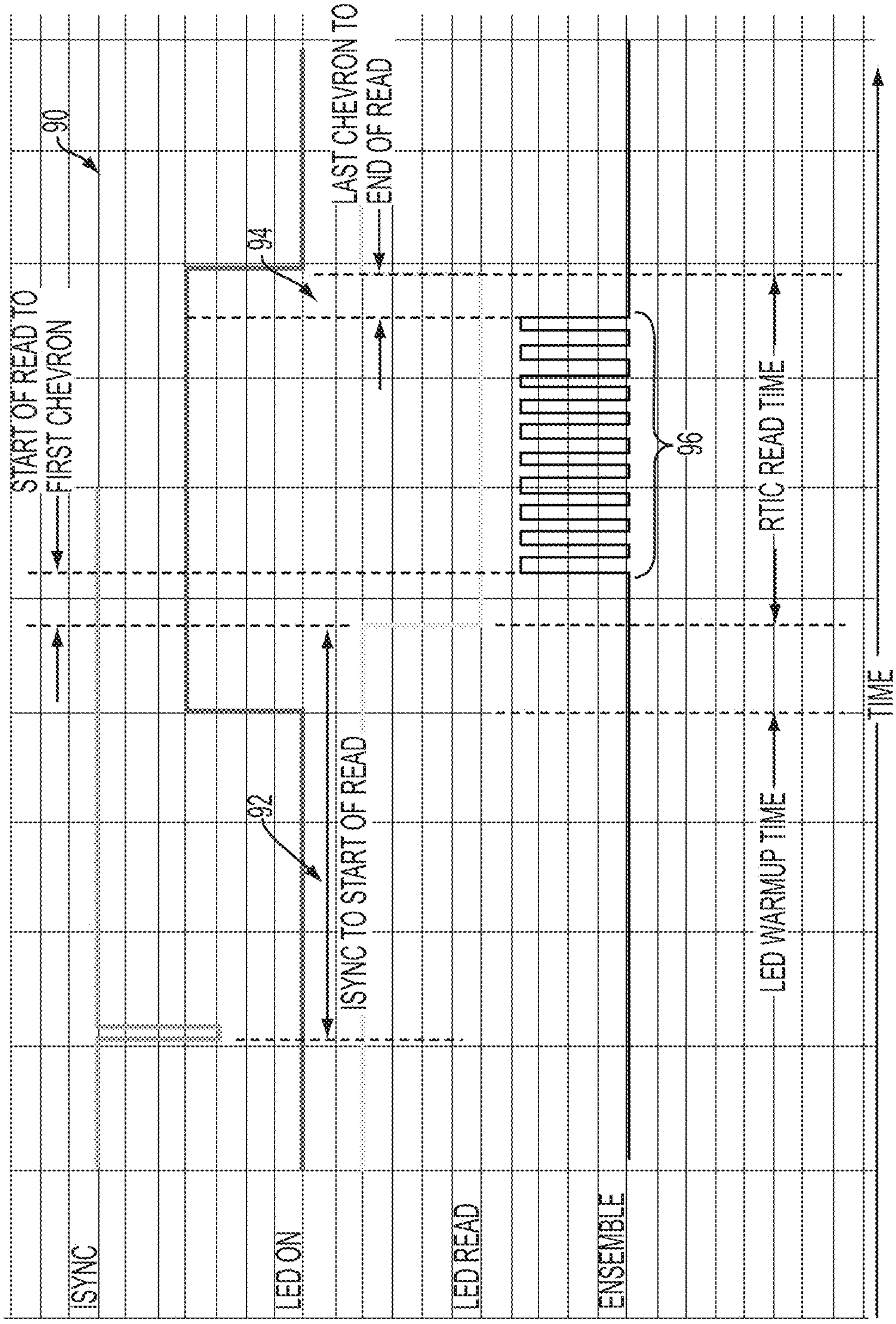
FIG. 4 illustrates a graph showing a trace from one leg of one chevron ensemble as the ensemble passes under a MOB sensor, in accordance with various features described herein.

FIG. 4 illustrates a graph 90 showing a trace from one leg of one chevron ensemble as the ensemble passes under a MOB sensor, in accordance with various features described herein. A time period 92 between Isync and the start of read time is calculated based on the nominal geometry of the machine, the nominal belt layout, and the measured PR speed. A time period 94 between detection of a last chevron leg and the end of the read window is also calculated. In the described example, for each chevron, 10 (or some other suitable predetermined number) of voltage peaks 96 are detected by each leg of each MOB. Under conventional approaches, problems can arise when one or more of the elements or variables in the timing equation differ from expected values, which can cause the read window start to be too early or end too late, resulting in an incorrect number of marks being measured or detected.

Figure 5:
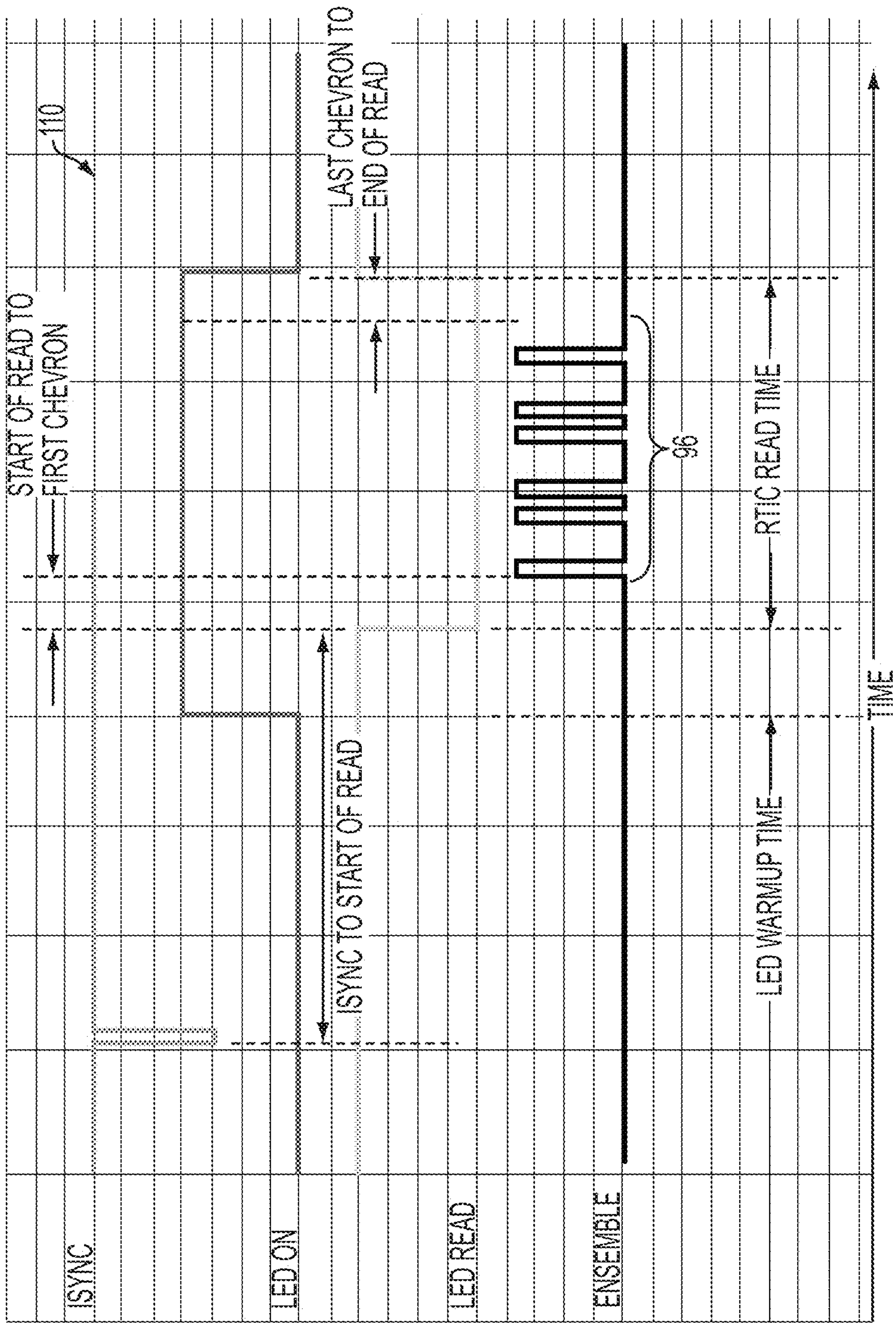
FIG. 5 illustrates a graph showing a trace of the MOB signal from the OB leg of the MOB sensors when only printing the cyan portion of the chevron ensemble, in accordance with one or more aspects described herein.

FIG. 5 illustrates a graph 110 showing a trace of the MOB signal from the OB leg of the MOB sensors when only printing and/or measuring the cyan portion of the chevron ensemble, in accordance with one or more aspects described herein. The spacing of the voltage peaks 96 in the bottom trace (labeled "Ensemble") correspond to the left hand (OB) side cyan legs as shown in FIG. 3. According to one example, the printer (FIG. 6) prints only the cyan legs of the chevron ensembles on the photoreceptor belt, which are then detected by the MOB sensor.

Figure 6:
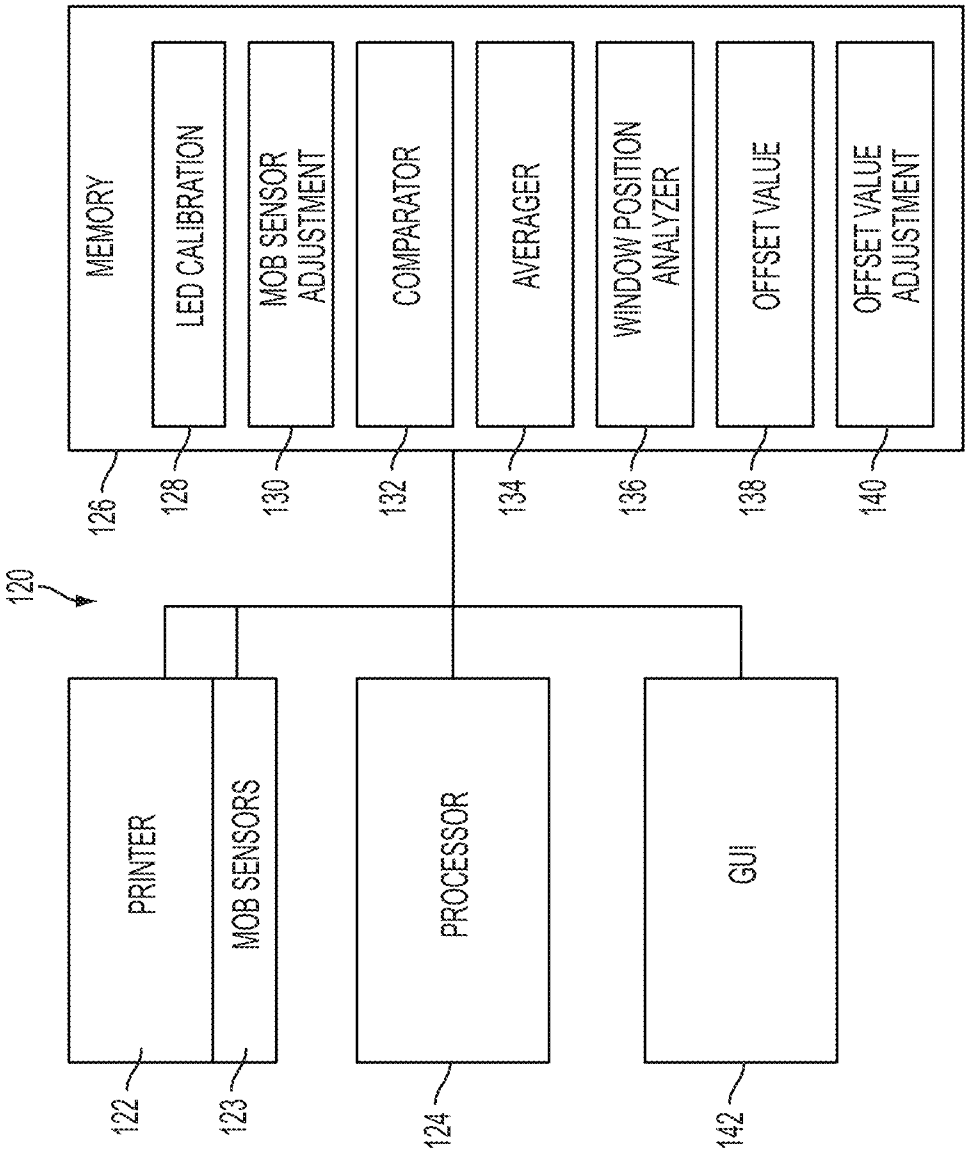
FIG. 6 illustrates a system that facilitates automatically adjusting MOB sensor timing for calibration of a print engine, in accordance with one or more features described herein.

FIG. 6 illustrates a system 120 that facilitates automatically adjusting MOB sensor timing for calibration of a print engine, in accordance with one or more features described herein. The system comprises a print engine 122 that is coupled to a plurality of MOB sensors 123 as well as to a processor 124 that executes, and a memory 126 that stores computer-executable instructions for performing the various functions, methods, techniques, steps, and the like described herein. The processor 124 and memory 126 may be integral to each other or remote but operably coupled to each other. In another embodiment, the processor 124 and memory 126 are integral to the printer 122. In another embodiment, the processor and memory reside in a computer (e.g., the computer 30 of FIG. 1) that is operably coupled to the printer 122.

The memory stores an LED calibration module 128 that is executed by the processor to perform LED calibration for the print engine during print engine setup. During the MOB calibration portion of print engine setup, the system executes a MOB sensor timing adjustment or calibration module 130 once the LED calibration has been successfully completed. The MOB sensor adjustment module 130 adjusts the timing of a MOB sensor read window in order to ensure that the window is centered about calibration marks (chevrons) printed on the PR belt (FIG. 2). According to an example, after the LED calibration of the MOB has been successfully completed, the cyan portion (or other selected color) of the chevron ensemble is printed by the print engine in the inter-document zones (IDZs) of the PR belt (FIG. 2) where they would normally be printed during run time (e.g., using 10 pitch mode or the like). Using the nominal timing, the signal coming off of the MOB leg that is measuring the left or outboard (OB) side of the chevron is captured and analyzed e.g., by the processor via the print engine. This step is performed for both the inboard (IB) and the OB MOBs (see FIG. 4). For each IDZ (e.g., 10 IB+10 OB=20 total according to an example), a comparator module 132 determines whether there are N marks, where N is an integer, (e.g., 5 or some other predetermined number) seen during the read window, the N marks corresponding to a predetermined number of cyan (or some other selected chevron leg color) marks in the OB side of the chevron ensemble pattern. If there are N reads in each window, then an average module 134 computes an average of the time from the start of read to the first mark for each of M captures, where M is an integer (e.g., 20 or some other predetermined number). A window position analyzer module 136 subtracts the average value from an expected distance value for the nominal start of read to the first chevron, and the difference (the result of the subtraction) is used to adjust a MOB read time offset value 138 in non-volatile memory (NVM) in order to cause the window to be centered on the chevron marks.

If there are less than N marks in any read window, then the window position analyzer 136 determines whether the read window is starting too early or too late. Since the pattern of the cyan chevrons in the OB leg of the ensemble is asymmetric in the process direction, the measured time between marks can be compared to the expected time between marks to determine whether only the last portion of the pattern or only the first portion of the pattern has been captured, the window position analyzer 136 determines an amount by which the read window needs to be started earlier or later. For instance, the amount by which the offset value 138 in stored in NVM needs to be adjusted is determined from the geometry of the pattern. The offset value 138 is adjusted accordingly by an offset value adjustment module 140, which overwrites the initial offset value with the adjusted offset value.

In another embodiment, window position information, adjustment information, etc., is displayed graphically on a graphical user interface 142 that may be integral to the printer 122, remote but operably coupled thereto, or may reside on a computer such as the computer 30 of FIG. 1.

As stated above, the system 120 comprises the processor 124 that executes, and the memory 126 that stores one or more computer-executable modules (e.g., programs, computer-executable instructions, etc.) for performing the various functions, methods, procedures, etc., described herein. Additionally, "module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for calibrating the timing for a mark-on-belt (MOB) sensor, comprising:

marking a photoreceptor belt with cyan portions of at least a first and second calibration chevron ensembles;

using nominal timing, reading the first and second calibration chevron ensembles during a predefined sensor read window;

analyzing a first signal from an outboard MOB leg of an outboard MOB that measures and outboard side of the first calibration chevron ensemble, and analyzing a second signal from an outboard MOB leg of an inboard MOB that measures an outboard side of the second calibration chevron ensemble; and for each chevron ensemble read, determining whether there are N cyan portions, where N is an integer, seen during the read window;

wherein N cyan portions are detected in each read window, and further comprising:

computing an average for the time from a start of the read window to the first detected cyan portion for each of M captures, where M is an integer;

calculating a difference between the computed average and an expected distance value for the nominal start of the read window to the first chevron ensemble; and adjusting a MOB read window offset value as a function of the calculated difference thereby centering the read window on the chevron ensembles.

2. The method according to claim 1, wherein fewer than N cyan portions are detected in each read window, and further comprising:

determining a starting position of the read window as a function of the number of cyan portions detected and their position in the chevron ensemble;

adjusting a MOB read window offset value as a function of the determined starting position of the read window thereby centering the read window on the chevron ensembles.

3. The method according to claim 2, wherein determining a starting position of the read window further comprises:

measuring time between detected cyan portions and comparing the measured time to and expected time between cyan portions in order to determine that one of a last portion and a first portion of the chevron ensemble has been captured;

determining an adjustment to the start time of the read window as a function of the captured portion of the chevron ensemble.

4. The method according to claim 1, wherein the cyan portions of the at least a first and second calibration chevron ensembles are printed having positions on the photoreceptor belt that correspond to their respective positions relative to the yellow, magenta, and key portions that are omitted from the chevron ensembles.

5. The method according to claim 1, wherein the calibration chevron ensembles are printed in one or more interdocument zones (IDZs) on the photoreceptor belt.

6. The method according to claim 1, wherein the N cyan portions correspond to a predetermined number of cyan marks in the OB side of the chevron ensemble pattern.

7. The method according to claim 1, further comprising printing the cyan portions in 10 pitch mode.

8. A processor configured to execute computer-executable instructions for performing the method of claim 1, the instructions being stored on a non-transitory computer-readable medium.

9. A system that facilitates calibrating mark-on-belt (MOB) sensor timing, comprising:

a printer comprising a photoreceptor belt, wherein the printer marks the photoreceptor belt with cyan portions of at least a first and second calibration chevron ensembles; and a processor configured to:

using nominal timing, read the first and second calibration chevron ensembles during a predefined sensor read window;

analyze a first signal from an outboard MOB leg of an outboard MOB that measures and outboard side of the first calibration chevron ensemble, and analyze a second signal from an outboard MOB leg of an inboard MOB that measures an outboard side of the second calibration chevron ensemble; and for each chevron ensemble read, determine whether there are N cyan portions, where N is an integer, seen during the read window;

wherein N cyan portions are detected in each read window, and wherein the processor is further configured to:

compute an average for the time from a start of the read window to a first detected cyan portion for each of M captures, where M is an integer;

calculate a difference between the computed average and an expected distance value for the nominal start of the read window to the first chevron ensemble; and adjust a MOB read window offset value as a function of the calculated difference thereby centering the read window on the chevron ensembles.

10. The system according to claim 9, wherein fewer than N cyan portions are detected in each read window, and wherein the processor is further configured to:

determine a starting position of the read window as a function of the number of cyan portions detected and their position in the chevron ensemble; and adjust a MOB read window offset value as a function of the determined starting position of the read window thereby centering the read window on the chevron ensembles.

11. The system according to claim 10, wherein the processor, when determining a starting position of the read window, is further configured to:

measure time between detected cyan portions and comparing the measured time to an expected time between cyan portions in order to determine that one of a last portion and a first portion of the chevron ensemble has been captured;

determine an adjustment to the start time of the read window as a function of the captured portion of the chevron ensemble.

12. The system according to claim 9, wherein the cyan portions of the first and second calibration chevron ensembles are printed in positions on the photoreceptor belt that correspond to their respective positions relative to the yellow, magenta, and key portions that are omitted from the chevron ensembles.

13. The system according to claim 9, wherein the calibration chevron ensembles are printed in one or more interdocument zones (IDZs) on the photoreceptor belt.

14. The system according to claim 9, wherein the N cyan portions correspond to a predetermined number of cyan marks in the OB side of the chevron ensemble pattern.

15. The system according to claim 9, wherein the printer prints the cyan portions in 10 pitch mode.

16. A computer-implemented method for calibrating MOB sensor timing, comprising:

marking inter-document zones of a photoreceptor belt with fewer than all lines of at least a first and second calibration chevron ensembles, wherein the marked lines have a common color;

reading the first and second calibration chevron ensembles during a predefined sensor read window;

analyzing a first signal from an outboard MOB leg of an outboard MOB that measures and outboard side of the first calibration chevron ensemble, and analyzing a second signal from an outboard MOB leg of an inboard MOB that measures an outboard side of the second calibration chevron ensemble; and for each inter-document zone, determining whether N lines are detected, where N is an integer, seen during the read window;

wherein N lines are detected in each read window, and further comprising:

computing an average for the time from a start of the read window to a first detected line for each of M captures, where M is an integer;

calculating a difference between the computed average and an expected distance value for a nominal start of the read window to the first chevron ensemble; and adjusting a MOB read window offset value as a function of the calculated difference thereby centering the read window on the chevron ensembles.

17. The method according to claim 16, wherein fewer than N lines are detected in each read window, and further comprising:

determining a starting position of the read window as a function of the number of lines detected and their position in the chevron ensemble;

adjusting a MOB read window offset value as a function of the determined starting position of the read window thereby centering the read window on the chevron ensembles.

18. The method according to claim 17, wherein determining a starting position of the read window further comprises:

measuring time between detected lines and comparing the measured time to and expected time between lines in order to determine that one of a last portion and a first portion of the chevron ensemble has been captured;

determining an adjustment to the start time of the read window as a function of the captured portion of the chevron ensemble.

19. The method according to claim 16, wherein the common color is cyan.

* * * * *